Sept. 25, 1962 W. F. STEFANICK 3,055,075
BLOCK MAKING MACHINE

Filed Jan. 11, 1960 8 Sheets-Sheet 1

INVENTOR
WILLIAM F. STEFANICK
By: Fetherstonhaugh & Co.
ATT'YS

Sept. 25, 1962 W. F. STEFANICK 3,055,075
BLOCK MAKING MACHINE
Filed Jan. 11, 1960 8 Sheets-Sheet 2

INVENTOR
WILLIAM F. STEFANICK
By: Fetherstonhaugh & Co.
ATT'YS

Sept. 25, 1962 W. F. STEFANICK 3,055,075
BLOCK MAKING MACHINE
Filed Jan. 11, 1960 8 Sheets-Sheet 4

INVENTOR
WILLIAM F. STEFANICK
By: Fetherstonhaugh & Co.
ATT'YS

Sept. 25, 1962  W. F. STEFANICK  3,055,075
BLOCK MAKING MACHINE
Filed Jan. 11, 1960  8 Sheets-Sheet 6

INVENTOR
WILLIAM F. STEFANICK
By: Fetherstonhaugh & Co.
ATT'YS

Sept. 25, 1962 W. F. STEFANICK 3,055,075
BLOCK MAKING MACHINE
Filed Jan. 11, 1960 8 Sheets-Sheet 7

INVENTOR
WILLIAM F. STEFANICK
By: Fetherstonhaugh & Co.
ATT'YS

United States Patent Office 3,055,075
Patented Sept. 25, 1962

3,055,075
BLOCK MAKING MACHINE
William F. Stefanick, Kennedy Road, R.R. 1,
Milliken, Ontario, Canada
Filed Jan. 11, 1960, Ser. No. 1,747
5 Claims. (Cl. 25—41)

This invention relates to a machine for moulding products such as concrete blocks, bricks and the like from an aggregate such as a concrete mix.

Moulding machines having a frame, a mould to receive a concrete or like aggregate, a block or anvil adapted to support the mould filled with aggregate upon a pallet, means for vibrating the mould as it is thus supported by the block, and a presser or stripping head having a shoe that engages with the aggregate and exerts a downward pressure upon the aggregate as the mould is vibrated for the purpose of compacting or sizing the aggregate, to make a moulded concrete product are well-known in the art.

I have discovered that the quality of the moulded product and the rate at which moulded products can be manufactured can both be substantially improved by reversing the direction of movement of the compacting force during vibration of the mould in a machine of the type above referred to, and by using a resilient means appropriately stressed to apply the compacting force. During the sizing operation I maintain the head rigid and, maintain the mould and a pallet upon which the mould rests in contact with each other as the mould is vibrated. The compacting force is applied at the pallet lifter so that in effect the pallet lifter moves upwardly towards the head. In the embodiment described herein the resilient means from which the compacting force is derived is underneath and adjacent to the pallet. In operation it reasserts itself in response to vibration of the mould to size the moulded product. By reason of its resilient support the pallet is maintained in constant contact with the mould and in effect hammers the aggregate against the rigid position of the head of the head assembly. The pallet action brought about by the amplitude of the mould vibration forces firm and efficient compaction of the aggregate. The invention will be clearly understood after reference to the following detailed specification read in conjunction with the drawings.

Figures 1, 1A:
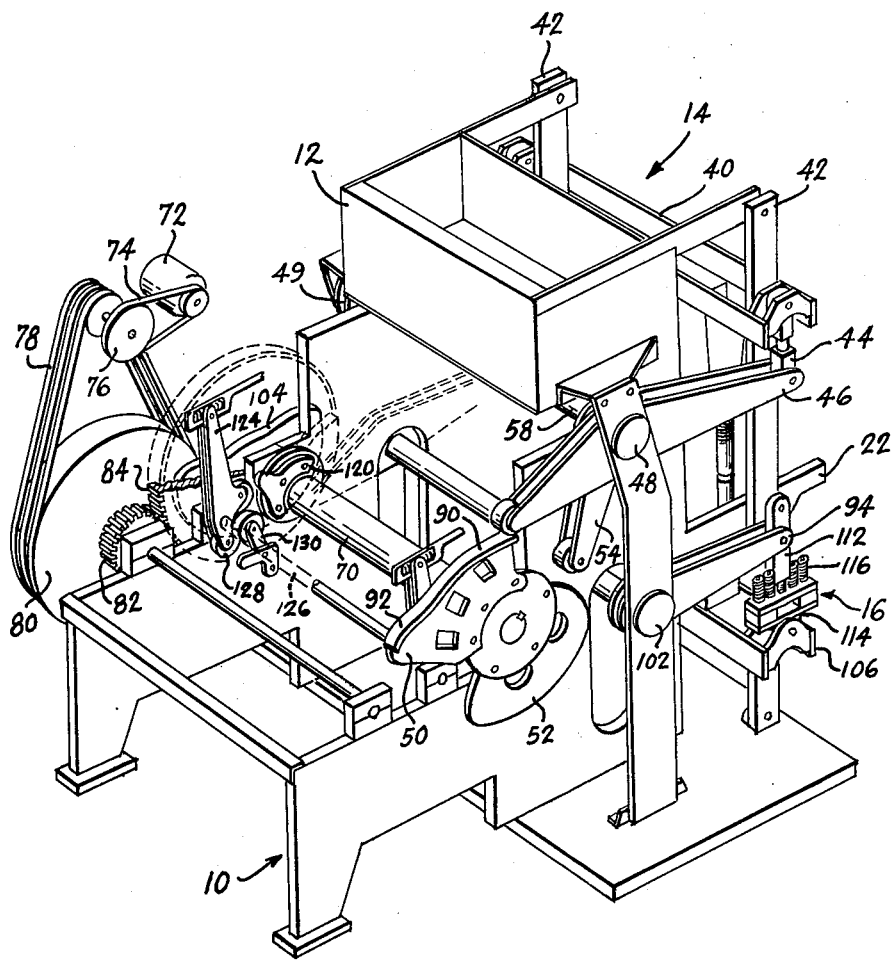
FIGURE 1 is a general view of the machine omitting the feed drawer, much of the head assembly, and much of the pallet lifter assembly in order to illustrate more clearly the parts that are shown. The view shows the beginning of the sizing phase.
FIGURE 1A is a sectional view illustrating the sliding engagement of the head assembly with the vertical post of the frame.

FIGURE 1 is a general view of a machine according to this invention with certain parts omitted. It generally comprises a rigid frame 10 within which is mounted a feed hopper 12 for aggregate, a vertically movable head assembly generally indicated by the numeral 14 and a vertically movable pallet lifting assembly generally indicated by the numeral 16 adapted to co-operate with the head assembly 14 in the forming of moulded products. Rigidly mounted feed hopper 12 co-operates with a reciprocating feed drawer 18 illustrated in FIGURES 6 and 6A. These principal parts will be referred to again later.

The machine illustrated is adapted to mould concrete blocks and in this connection employs a mould 20 of well-known design having side walls and being open at each of its ends. Mould 20 moulds three blocks at a time and is normally supported on rest bars 22 of the frame 10.

Briefly, a pallet 24 carried by the arms 26 of pallet lifter 16 is lifted to carry the mould 20 upwardly from the rest bars 22 of the frame. The mould is then filled with aggregate by the feed drawer 18. The feed drawer 18 then recedes and the head 30 of the head assembly 14 descends to engage with the aggregate in the mould and to force the mould and the pallet lifter assembly 16 in a downward direction against the resilience of a resilient means incorporated in the pallet lifter assembly to be referred to fully later. The head 30 is then maintained rigid against movement in an upward direction as the mould is vibrated whereby the aggregate in the mould is compacted and the moulded product is sized as the resilient means of the pallet lifter reasserts itself. The operation of the machine will be referred to again fully later. I will now describe the elements that I have briefly just referred to.

The vertically moving head assembly 14 comprises a pair of cross bars 40, joined at their ends, and adapted to slide in a vertical direction with respect to the rigid posts 42 of the frame 10. Links 44 pivotally connect with the bars 40 and with the control levers 46 and 47 at each side of the machine. Control levers 46 and 47 for the head assembly 14 are rigidly mounted upon a common shaft 58 that is rotatably mounted within the frame 10 as at 48 and 49. In this connection it will be noted that the lever 46 has an arm 54 rigidly connected thereto, for the purpose of engagement with cam 52.

A moulding head 30 is mounted on and extends downwardly from the bars 40. In use it is against this head that the compacting action takes place. Head 30 is formed at its free end to enter into the side walls of the mould cavities to engage aggregate to be moulded.

The cams 50 and 52 are each mounted on the bull shaft 70 which is appropriately journalled within the frame 10 and driven in the direction indicated by the arrow by means of the motor 72 through belt 74, pulley 76, belt 78, pulley 80, gear 82 and gear 84.

The function of the cams 50 and 52 as they rotate is to carry the head 30 of the head assembly 14 downwardly into contact with aggregate in a mould 20 and to force the rigidly held pallet carrier assembly downwardly against the resilience of its resilient means and to hold it there whereby the compacting action due to mould vibration referred to previously and to be fully described later can take place. After compaction or sizing these cams raise the head 14 to permit the feed drawer to move forward again and reload the mould. In this connection the cam 52 is adapted to raise the head assembly 14 while its associated cam 50 is adapted to maintain the head rigidly against upward displacement during the sizing operation.

In FIGURE 1, the relative positions of the cams during the sizing operation are illustrated. It will be noted that the cam follower at the end of control lever 46 engages with the cam 50 and that in this position, the head 14 is locked against upward movement.

The head 30 is maintained in this position as the cam follower of lever 46 travels over the cam surface indicated by the numeral 90. After sizing is completed, it is desirable that the moulded block be ejected or stripped from the mould and for this purpose, the head 30 moves downwardly as the cam follower of the lever 46 encounters the rise 92 of cam 50 to further enter the mould and begin the ejection of the sized moulded block. At the same time, as will be explained later, the pallet lifter drops. It might be added here that stripping is completed under the action of gravity as the pallet lifter assembly 16 drops further. This will be referred to again later.

Figure 2:
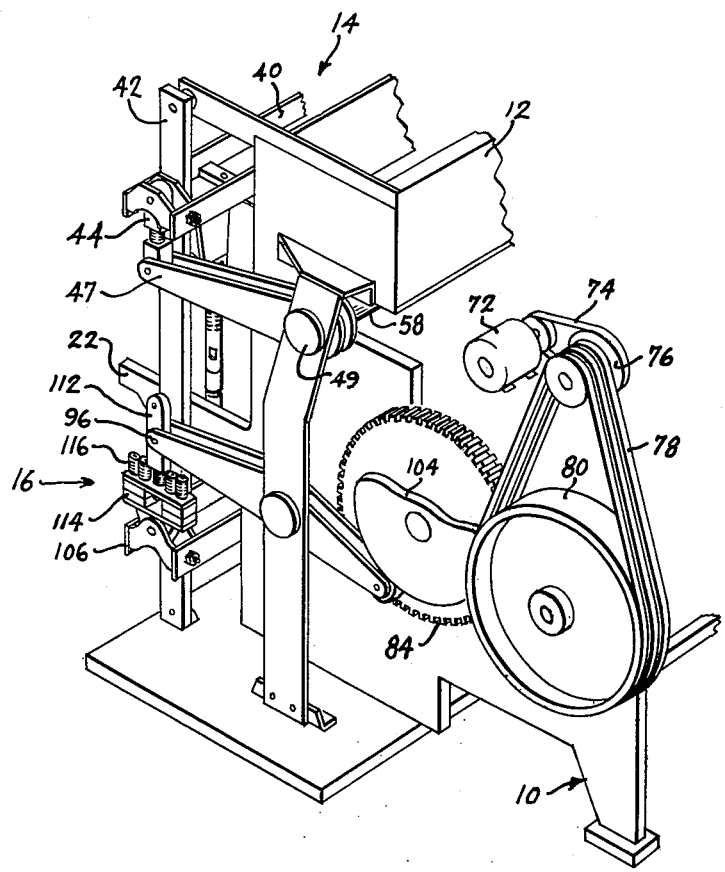
FIGURE 2 is a fragmentary view illustrating the pallet lifter assembly control cam and the head assembly suspension from the other side of the machine to FIGURE 1.

After the stripped block has been removed from the machine the head assembly 14 is raised preparatory to forming another moulded block. To do this cam 52 engages with the cam follower on the end of arm 54 as indicated in FIGURE 2 to effect the lifting of the head assembly and of the head 30.

The pallet lifter assembly 16 is raised and lowered by arms 94 and 96 which are in turn rigidly mounted on the shaft 58 that is journalled within the vertical standard of the frame as at 102.

Arm 96 has a cam follower at one end thereof that engages with the pallet lifter control cam 104. This cam is rigidly mounted on the shaft 70. In use, it will be apparent that the arms 94 and 96 and therefore the pallet lifting assembly, will drop when the cam follower on the arm 96 engages with the flat portion of the cam 104 and will rise when the cam follower engages the rounded portion of this cam. The rise and fall of the pallet lifting assembly is timed in conjunction with the operation of the head assembly as will be described later.

The pallet lifting assembly comprises a horizontally extending base 106 adapted for sliding engagement with the vertical posts 42 of the frame and having a series of vertically extending arms 26. The sliding engagement of the pallet lifting assembly with the guide posts 42 is similar to the sliding engagement of the head assembly with the guide posts. Resilient rubber or like pads 110 are mounted at the free ends of the arms 26 for engagement with the underside of a pallet in use.

The horizontally extending base 106 of the pallet lifter assembly 14 is connected to the free ends of the arms 94 and 96 by means of the links 112, the yokes 114, compressible springs 116 and the bolts 118. The horizontally extending base 106 connects with the yokes 114 at each of its ends. Bolts extend through the yokes 114 and through the bottom bar of the links and have the springs 116 around their shanks. Springs 116 are compressible in use as will be referred to later. Links 112 pivotally connect with the free ends of the control levers 94 and 96.

In use, the pallet lifter is raised to carry a mould from the mould rest bars 22. Following this initial raising, the head 30 of the head assembly 14 moves downwardly against the aggregate in the mould to cause the resilient pads 110 and the springs 116 to yield whereby to move the pallet lifter assembly in a downward direction. Following this, the mould is vibrated as it sits on the pallet in the customary manner and, as a result of the vibration, the aggregate is compacted due to the reassertion of the compressed resilient pads 110 and springs 116.

In this latter connection it is important that the resilient pads 110 be adjacent the underside of the pallet so that they can cause the pallet to efficiently follow the mould as it vibrates without loss of effect due to the inertia of mechanical parts between them and the pallet.

The springs 116 tend to have the same effect as the rubber pads 110 since they also tend to reassert themselves, as the mould vibrates and the aggregate becomes compacted. Their action upon the pallet however is not nearly as effective because they have the weight of a substantial part of the pallet lifter between them and the point of application of the reasserting force to the pallet. Springs 116 however, do serve the purpose in combination with the rubber pads 110 of causing the pallet lifter to follow the aggregate as it is compacted against the rigidly held head of the head assembly.

Figure 6:
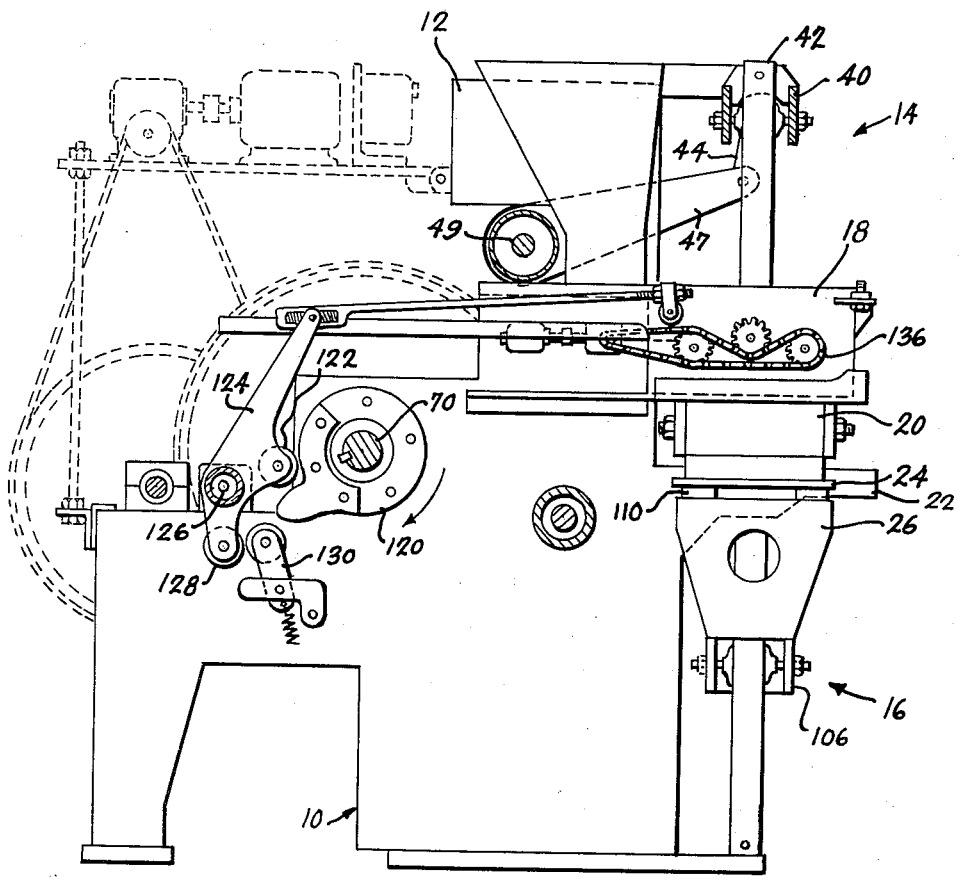
FIGURE 6 is a view illustrating the feed drawer operating mechanism, in feeding position.
Figure 6A:
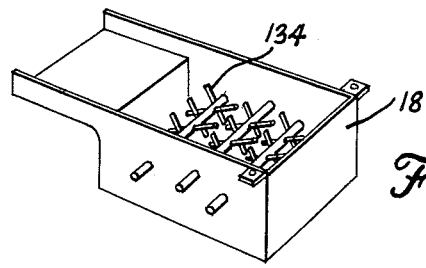
FIGURE 6A is a view of the feed drawer.

The feed drawer 18 is cam controlled to move forward when the head 30 of the head assembly 14 is raised to load a mould as it rests on a pallet. The box 18 retracts to a position underneath the feed hopper 12 when the compacting of the aggregate takes place. The feed drawer operating mechanism is best illustrated in FIGURE 6. It comprises a cam 120 mounted on the bull shaft 70 and adapted for engagement with the roller 122 of the pivotally mounted arm 124 of the Geneva movement illustrated.

In FIGURE 6 the feed drawer 18 has been illustrated in a forward position. The cam 120 is about to engage with the roller 122 to move the arm 124 to the left about its pivot point 126. As it does so, roller 128 will move to the right of the spring loaded lever 130. This movement will draw the feed drawer 18 in a rearward direction to underlie the feed hopper 12. Later in the cycle the cam 120 will engage roller of lever 130 which will in turn engage with roller 128 to return the arm 124 to the position illustrated and again advance the feed drawer 18 to the position illustrated in FIGURE 6. Agitators 134 power operated by the chain 136 in a manner well-known in the art are provided within the feed drawer for the purpose of securing a good movement of materials within the feeding mechanism. This is well-known in the art and will not be referred to in detail in this application.

Numerals 140 and 142 refer to sizing pins. Sizing pins 140 is rigidly mounted upon the pallet lifter assembly 16 while pins 142 is rigidly mounted upon the head assembly 14. As the pallet lifter assembly moves towards the head assembly in the sizing operation, these pins approach each other. When they touch, the sizing operation is completed, and the full extent of the permitted travel of the pallet lifter assembly towards the head assembly has been reached. The use of sizing pins is well-known in the art and detailed reference to them will not be made in this application.

The operation of the unit is as follows:

FIGURE 6 illustrates the feed drawer 18 in feeding position overlying the mould 20 which in turn rests on the pallet 24. The pallet is supported by the unstressed resilient pads 110 on the arms 26 of the pallet lifter. The position of the pallet lifter assembly is controlled by the pallet lifter arms 94 and 96 and pallet lifter cam 104.

Following loading the feed drawer delivery cam 120 engages with the roller 122 on the roller arm push rod assembly to retract the feed drawer 18.

During this period the head assembly is maintained in a raised position by means of the cam 52. As the bull shaft 70 rotates cam 52 falls away from its cam follower and permits the head assembly to drop under its own weight and the head 60 thereof enters the cavities of the mould and engages with the aggregate in the mould.

After the head 60 engages with the aggregate, the cam 50 engages with its cam follower to lock the head assembly in a locked position with respect to the frame against movement in an upward direction.

At the same time, the cam 50 forces the head of the head assembly downwardly against the aggregate to stress the resilient rubber pads 110 and springs 116 of the pallet lifter assembly thereby causing them to yield about between $\frac{1}{16}$ and $\frac{5}{8}$ of an inch as will be referred to later. The cam 50 is illustrated in an operative position in FIGURE 7.

Following the stressing of the rubber elements and springs of the pallet lifter assembly by the cam 50, the vibrators operate on the mould whereby the stressed aggregate compacts as the spring and rubber elements reassert themselves against the firm position of the head 30 of the head assembly. In this connection, the rubber elements 110 being immediately underneath the pallet are able to follow the action of the pallet almost instaneously as it is caused to vibrate by the vibrating mould and it is principally due to these in combination with the rigidly maintained head 30 that the efficient compaction or sizing is obtained. The springs 116 which are underneath the weight of the arms 26 of the pallet lifter assembly help sustain the pressure on the underside of the pallet and assist the pallet lifter assembly 14 follow the pallet and the mould as it moves upwardly during sizing.

The sizing is completed when the gauge pins meet. The pins then serve to limit the movement of the pallet lifter towards the head.

Vibration of the mould is, according to standard practice, stopped just prior to the stripping operation which will be referred to shortly.

Figure 7:
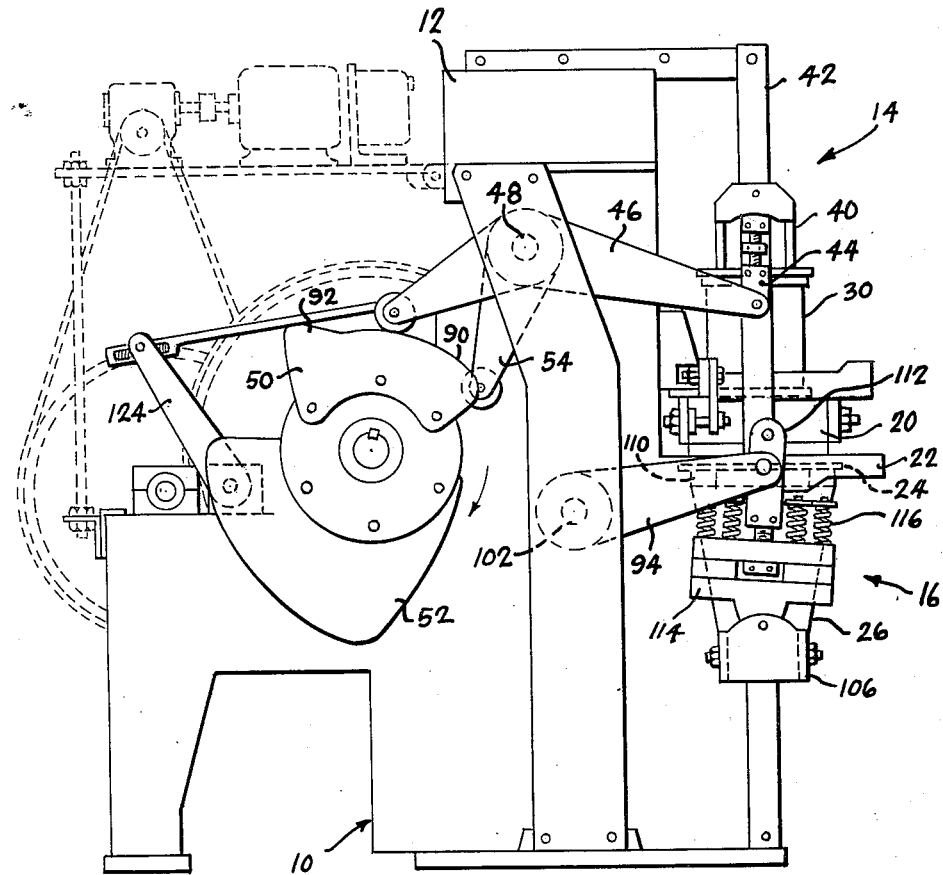
FIGURE 7 illustrates the head block engaged with the aggregate in the mould as the mould is supported from beneath by the resilient rubber pads and the head is held by the firm pack cam.
Figure 8:
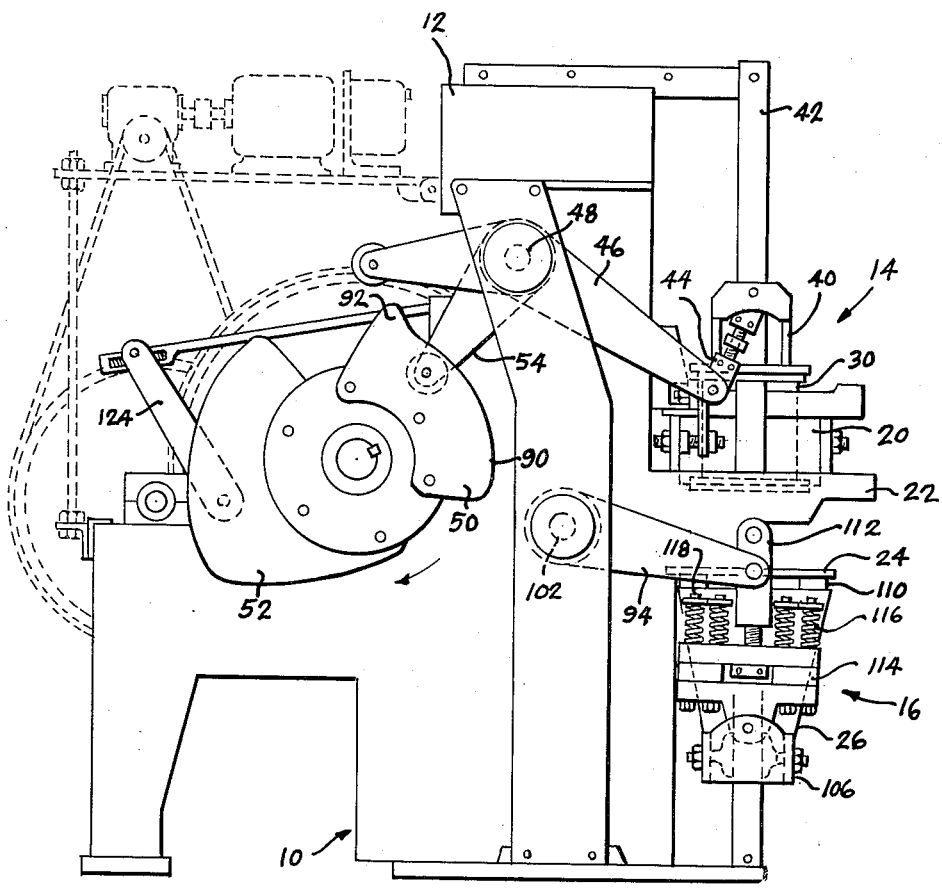
FIGURE 8 is a view illustrating the stripping of a moulded block from the mould.

It will be noted that the firm pack cam has a rise 92 towards its left side as viewed in FIGURE 7. This is designed to cause the head 60 to move in a downward direction to positively push the moulded products from the mould after sizing. As the head 30 moves downwardly of course, provision must be made for the dropping of the pallet lifter assembly. In this connection, the cam follower of the pallet lifter assembly engages with the flat side of the pallet lifter cam 104 as the rise in the firm pack cam engages the rise 92. Thus both the pallet lifter assembly 16 and the head assembly 14 drop together as the moulded product is stripped from the mould 20 which is deposited on and supported by the rest arms 22 of the frame 10.

The stripping portion 92 of the cam 50 zeros out after about 30% to 50% of the stripping action has taken place and stripping continues controlled by gravity and the fall of the pallet lifter assembly cam 104.

During the downward travel of the pallet lifter assembly and after the moulded product has cleared the mould, a transfer device removes the pallet with the moulded block thereon from the pallet lifter and places a fresh pallet on the pallet lifter in position ready for upward movement again towards the mould.

The bottom position of the pallet lifter is controlled by the flat portion of the pallet lifter cam 104. When the pallet lifter cam follower reaches the rounded portion of the pallet lifter cam again, the pallet lifter begins to rise carrying the empty pallet again into contact with the mould to raise it.

It will be remembered that during stripping the mould is deposited onto a set of rest bars where it remains until it is again raised by a pallet carried up by the pallet lifter.

The vertical travel of a mould in common practice is about ¾ of an inch from the rest bars 22.

When the stripping action is just about complete and the head 30 shows at the bottom of the mould the head assembly engages a stop. The head assembly is then raised from this position by head assembly cam 52. This action occurs at the same time as the pallet lifting action begins. The head is thus lifted so that the feed drawer 18 can again advance to fill a raised mould.

The reasserting force at the pallet of the stressed pallet lifter which tends to drive the aggregate upwardly against the rigid head must during the sizing operation be of sufficient magnitude to maintain the pallet in contact with the mould. There should be substantially no movement of the mould with respect to the pallet as the mould is vibrated during the sizing operation.

It will thus be apparent that when the gauge pins meet and the sizing is completed, the resilient rubber pads and springs should not have fully reasserted themselves at sizing because vibration is taking place and there must be sufficient force in the resilient means to keep the pallet in contact with the mould as aforesaid.

The amplitude of mould vibration varies. I have found that three-sixteenths of an inch used for a concrete block having a depth of 8" is satisfactory.

It will be apparent that where sizing is achieved by means of the reassertion of a resilient means in the pallet lifter that it is desirable to locate the resilient means close to the pallet so that the resilient means will not have to move the weight of the pallet lifter as it reasserts itself.

The unit compacting force on the aggregate is a function of the amount of compression of the resilient means, the total weight of the mould, presser head, presser head frame and aggregate in the mould and the mould area on the pallet. In an 8" concrete block machine that is adapted to make three solid concrete blocks 8" deep that together have an area in contact with the pallet of 384 sq. in. I have found that the pallet force on the aggregate at size can be approximately represented by the formula:

$$\frac{920N - TW}{A} \text{ lbs. per sq. in.}$$

where $N$ = the number of ⅟₁₆ of inches that the pallet lifter is depressed when the gauge pins meet and sizing is complete.
$TW$ = the total weight of mould, presser head, presser head frame and the aggregate in the mould.
$A$ = aggregate area on the pallet.

Thus, if the gauge pins are set such that sizing is completed with a compression of the pallet lifter of ½" the pallet force against the aggregate is $$\frac{920 \times 8 - 1500}{384} = 15.3 \text{ per sq. in.}$$

for a three block machine at size.

The factor 920 in the above formula decreases slightly for smaller compressions of the pallet lifter at size.

Figure 3:
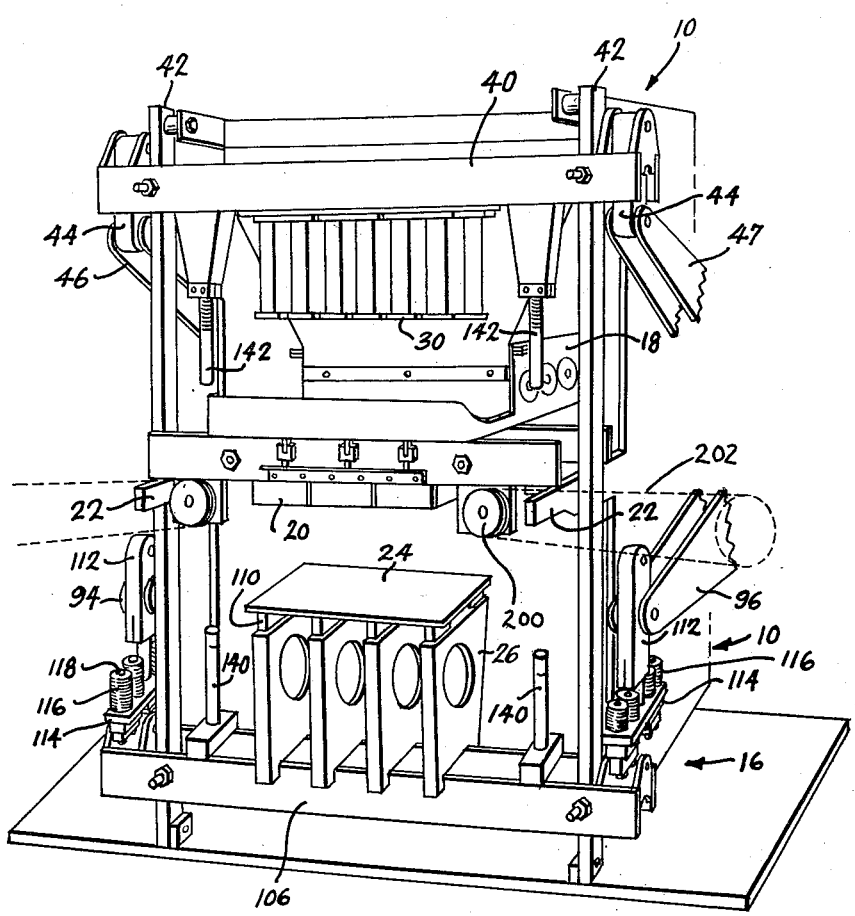
FIGURE 3 is a fragmentary front view showing the pallet lifter and the head assembly.
Figure 4:
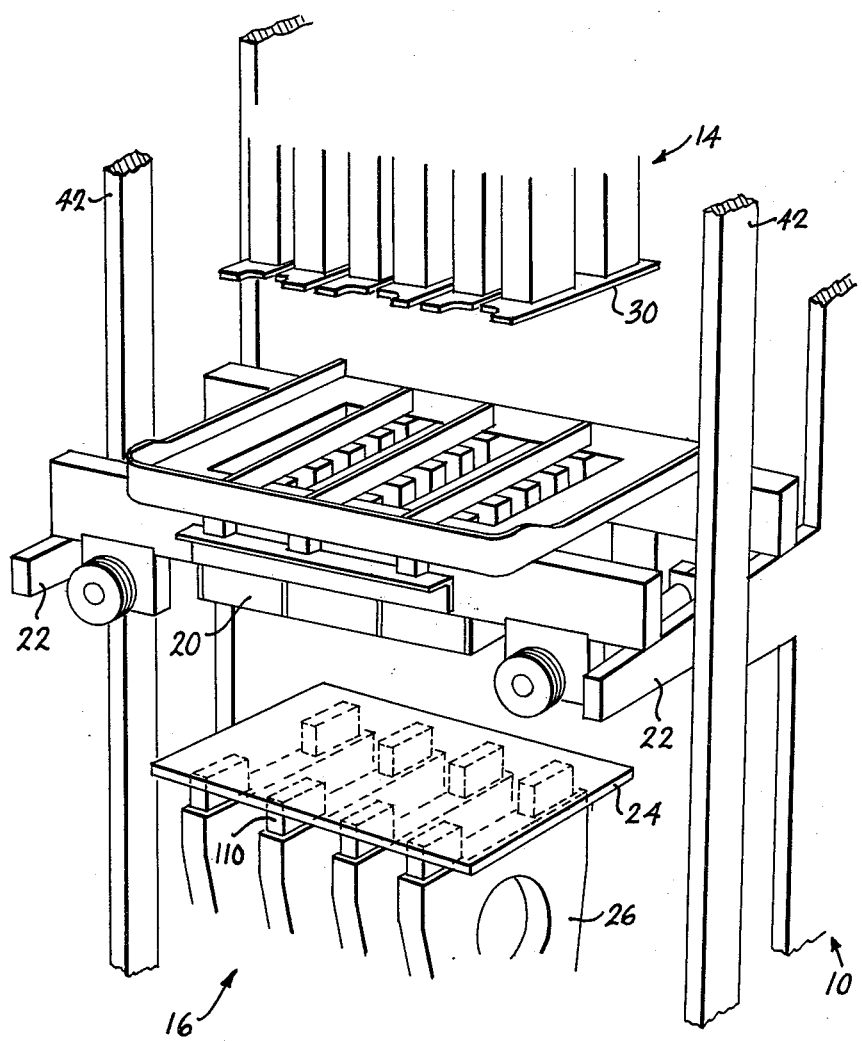
FIGURE 4 shows a mould as it is supported by the frame prior to being lifted by a pallet on the pallet lifter assembly.
Figure 5:
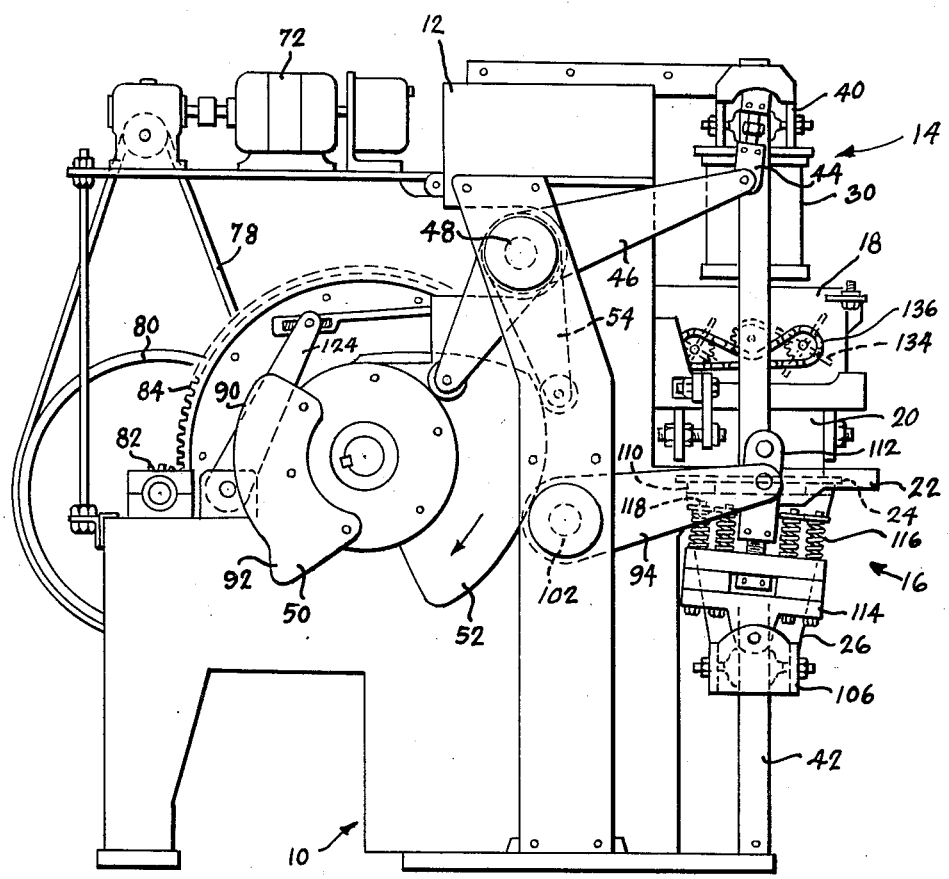
FIGURE 5 is a view showing the feed box in the feeding position.

The vibrators are of known design and comprise eccentrically mounted weights on shaft of pulleys 200 on each side of the mould that are rotated by motor driven continuous belts indicated by dotted lines as at 202 on FIGURE 3.

Other vibrating means are of course possible. One could for example apply vibration from beneath the pallet.

An essential feature of the invention is that the vibrating pallet and mould be kept in constant contact with each other during sizing as the aggregate is forced upwardly against a rigid pressed head. The result could be achieved in addition to the way illustrated by clamping the mould and pallet together and applying the vibrating force from below the pallet.

Further according to common practice vibration is applied as the mould is being filled. It is also preferable to apply vibration to the mould after sizing is completed, again according to common practice.

What I claim as my invention is:

1. In a block making machine having a base, a mould, means for vibrating the mould, a head adapted for co-operation with the contents of the mould, a pallet for supporting said mould, means for limiting the relative motion of said head and pallet towards each other to determine the end of sizing and means for operating said head and pallet to strip a block from the mould after sizing, the improvement comprising resilient means for said pallet stressable to yield and permit movement of said pallet and mould in a downward direction, a head actuating means for moving said head downwardly a predetermined distance to engage with the contents of said mould and displace said contents, said mould, and said pallet downwardly to stress said resilient means with a force greater than the gravity force exerted by said head, head locking means for positively locking the head against upward displacement with respect to the base after said head has moved said predetermined distance and means for relieving the downward force exerted by said head actuating means on said head, said resilient means being responsive to mould vibration to reassert itself with a reasserting force to move said pallet and mould in an upward direction.

2. A block making machine as claimed in claim 1 in which said resilient means underlies the pallet and yields as aforesaid in close proximity to said pallet.

3. A block macking machine as claimed in claim 1 in which said resilient means underlies the pallet and includes a resilient solid material which yields as aforesaid in close proximity to said pallet.

4. A block making machine as claimed in claim 1 in which said resilient means includes a resilient device underlying said pallet and yielding as aforesaid in close proximity to said pallet and also a resilient device associated with said pallet support more remotely from said pallet.

5. A block making machine as claimed in claim 1 in which said resilient means includes a resilient solid material underlying said pallet and yielding as aforesaid in close proximity to said pallet and spring means more remote from said pallet.

References Cited in the file of this patent
UNITED STATES PATENTS

| | | |
|---|---|---|
| 2,382,458 | Williams | Aug. 14, 1945 |
| 2,589,115 | Nelson | Mar. 11, 1952 |
| 2,622,301 | Argarden | Dec. 23, 1952 |
| 2,957,222 | Zmania et al. | Oct. 25, 1960 |
| 2,961,730 | Marino | Nov. 29, 1960 |
| 2,985,935 | Wellnitz | May 30, 1961 |